United States Patent Office 3,763,257
Patented Oct. 2, 1973

3,763,257
DEHYDROGENATION PROCESS
Christopher Patrick Cadman Bradshaw, Hampton, and Peter Antony Longstaff, Egham, England, assignors to BP Chemicals Limited, London, England
No Drawing. Filed July 1, 1970, Ser. No. 51,666
Claims priority, application Great Britain, July 8, 1969, 34,279/69
Int. Cl. C07c 5/18
U.S. Cl. 260—669 R
6 Claims

ABSTRACT OF THE DISCLOSURE

The invention consists of a process for the production of a catalyst suitable for use in the dehydrogenation of hydrocarbons, which comprises impregnating a support with a solution of (1) a compound of molybdenum which decomposes on heating to form an oxide, a solution of (2) a basic compound of a metal selected from the group consisting of alkali alkaline earth metals and a solution of (3) a compound of a metal selected from Groups IB-V, VII and VIII of the Periodic Table, chromium, tungsten and uranium and drying the impregnated material. Also a process for the dehydrogenation of the hydrocarbon by contacting with the catalyst, in the presence of a hydrogen acceptor such as ethylene, propylene or carbon dioxide.

---

This invention relates to a catalyst suitable for use in a dehydrogenation process and to a dehydrogenation process employing such a catalyst.

According to one aspect of the invention there is provided a process for the production of a catalyst suitable for use in the dehydrogenation of hydrocarbons, which process comprises impregnating a support with a solution of (1) a compound of molybdenum which decomposes on heating to form an oxide, a solution of (2) a basic alkali or alkaline earth metal compound and a solution of (3) a compound of a metal of Groups IB-VIII oher than (1) and (2) of the Periodic Table according to Mendeleef and drying the impregnated material.

The support may be impregnated with solutions of (1), (2) and (3) consecutively in any sequence or concurrently.

Suitable supports are alumina and silica, of surface area greater than 25 m.$^2$/g., preferably greater than 150 m.$^2$/g.

Suitable compounds (1) include molybdenum trioxide.

Suitable compounds (2) include potassium bicarbonate and lithium hydride.

Suitable compounds (3) include palladium acetate, tetrammino platinous hydroxide, cupric nitrate and ammonium perrhenate. The preferred compounds (3) are compounds of transition metals.

Preferably impregnation is carried out under such conditions that the catalyst contains 0.5–40% by weight of molybdenum oxide, 0.01–15% by weight of the base expressed as percent alkali or alkaline earth metal oxide and 0.1–20% of the Group IB-VIII metal compound, expressed as percent by weight metal.

Preferably the catalyst is activated before use.

Activation is suitably achieved by heating at a temperature in the range 200° to 900° C., suitably in a stream of hydrogen, air, nitrogen, oxygen, carbon monoxide, carbon dioxide or an inert gas.

Under these conditions, components (1) decompose to the metal oxide and, if a reducing gas is employed, the oxide may be partially or completely reduced to the metal. Components (2) are decomposed to the oxide. Some components (3) are readily reduced to the metal during activation in a reducing atmosphere and some are not. Amongst the former are palladium acetate and cupric nitrate and amongst the latter are manganous nitrate and ammonium metavanadate. Whether components (1) or (3) are present wholly or partially in the free metallic form is not of greater significance.

The catalysts are particularly suitable for use as hydrocarbon dehydrogenation catalysts.

If activation is not carried out as a prior step before the catalyst is used in a dehydrogenation process, then the conditions employed during dehydrogenation will tend to produce similar chemical changes in the catalyst.

According to another aspect of the present invention there is provided a process for the dehydrogenation of a hydrocarbon which process comprises contacting the hydrocarbon in the presence of a hydrogen acceptor with a catalyst prepared as hereinbefore described at a temperature in the range 250° C. to 550° C. and a pressure in the range 0.1 mm. Hg to 2000 p.s.i.g.

Suitable hydrocarbons which may be dehydrogenated include $C_{4-20}$ linear, branched or cyclic alkanes, alkenes or polyenes. The preferred feedstocks are n-butenes which dehydrogenate to butadiene, isoamylenes which dehydrogenate to isoprene and ethylbenzene which dehydrogenates to styrene.

Suitable hydrogen acceptors include ethylene, propylene and preferably, carbon dioxide. The molar ratio of hydrogen acceptor to hydrocarbon is suitably in the range 0.1:1 to 9:1, preferably 1:1 to 6:1.

Dehydrogenation is preferably effected at a temperature in the range 400° C. to 500° C.

The pressure is preferably in the range 10 to 40 p.s.i.a.

The total feedstock may be passed over the catalyst at a gaseous hourly space velocity in the range 10 to 30,000, preferably in the range 100 to 10,000.

Alternatively the hydrocarbon feedstock may be passed over the catalyst at a liquid hourly space velocity in the range 0.1 to 10, preferably 0.5 to 3.

The invention is illustrated with reference to the following examples.

Comparison Test 1

A commercial alumina, Boehmite, 30–60 BSS mesh (97 g.), was treated with a solution of [Pd(NH$_3$)$_4$Cl$_2$]H$_2$O (7.4 g.), in water (100 ml.), dried first of all on a stream bath and then heated in an oven at 120° C. for 15 hours, and then heated in hydrogen for 3 hours at 500° C., the temperature being progressively raised to this value over a 1 hour period. The catalyst was washed with distilled water to remove the excess of chloride ions, and then both the hydrogen reduction and washing were repeated. The catalyst was dried on a steam bath and then in an oven at 120° C. for 15 hours. The resulting catalyst is hereinafter termed catalyst A.

Comparison Test 2

97 g. of a further quantity of the alumina of Comparison Test 1 was treated with a solution of Cu(NO$_3$)$_2$·3H$_2$O (11.4 g.), in water (100 ml.) and dried on a steam bath and then in an oven at 120° C. for 15 hours. The resulting catalyst is hereinafter termed catalyst B.

Comparison Test 3

80 g. of a further sample of the alumina of Comparison Test 1 was impregnated with a solution of $MoO_3$ (15.4 g.), and $KHCO_3$ (9.7 g.), in 7.4 M $NH_4OH$ (100 ml.), dried on a steam bath and dried for 15 hours at 120° C. The resulting catalyst is hereinafter termed catalyst C.

Example 1

Solution of $Pd(OAc)_2$, (2.2 g.), $MoO_3$ (14.3 g.), and $KHCO_3$ (9.7 g.), in 50, 90 and 30 ml. of 7.4 M $NH_4OH$ respectively, were combined and added to 80 g. of a further sample of the alumina of Comparison Test 1. The mixture was evaporated to dryness on a steam bath and heated at 120° C. for 15 hours. The resulting catalyst is hereinafter termed catalyst D.

Example 2

The procedure of Example 1 was followed using $MoO_3$ (14.6 g.), $KHCO_3$ (10.1 g.), and $Cu(NO_3)_2 \cdot 3H_2O$ (2.4 g.), in 7.4 M $NH_4OH$ (170 ml.). The resulting catalyst is hereinafter termed catalyst E.

Example 3

Solutions of $MoO_3$ (13.7 g.), and $KHCO_3$ (9.5 g.), in 7.4 M $NH_4OH$ (90 and 30 ml. respectively), were mixed with a solution of $Pt(NH_3)_4(OH)_2$ (2.8 g.), in water (50 ml.) and the whole added to 80 g. of a further sample of the alumina of Comparison Test 1. The mixture was evaporated to dryness on a steam bath and heated to 120° C. for 15 hours. The resulting catalyst is hereinafter termed catalyst F.

Example 4

The procedure of Example 1 was employed using $MoO_3$ (13.7 g.), $KHCO_3$ (9.5 g.), and $(NH_4)ReO_4$ (2.6 g.) in 7.4 M $NH_4OH$ (170 ml). The resulting catalyst is hereinafter termed catalyst G.

Example 5

The procedure of Example 1 was employed using $MoO_3$ (14.6 g.), $KHCO_3$ (10.2 g.), and $Co(NO_3)_2 \cdot 6H_2O$ (3.0 g.), in 7.4 M $NH_4OH$ (170 ml.). The resulting catalyst is hereinafter termed catalyst H.

Example 6

The procedure of Example 1 was employed using $MoO_3$ (14.3 g.), $KHCO_3$ (9.9 g.), and $AgNO_3$ (1.68 g.), in 7.4 M $NH_4OH$ (170 ml.). The resulting catalyst is hereinafter termed catalyst I.

Example 7

The procedure of Example 1 was employed using $MoO_3$ (14.6 g.), $KHCO_3$ (10.2 g.), $Zn(NO_3)_2 \cdot 6H_2O$ (3.2 g.), in 7.4 M $NH_4OH$ (170 ml.). The resulting catalyst is hereinafter termed catalyst J.

Example 8

The procedure of Example 1 was employed using $MoO_3$ (14.6 g.), KHCO (10.2 g.), $Ni(NO_3)_2 \cdot 6H_2O$ (3.0 g.), in 7.4 M $NH_4OH$ (170 ml.). The resulting catalyst is hereinafter termed catalyst K.

Example 9

The procedure of Example 1 was employed using $MoO_3$ (14.6 g.), $KHCO_3$ (10.2 g.), and $CO(NO_3)_2 \cdot 6H_2O$ (3.0 g.), in 7.4 M $NH_4OH$ (170 ml.). The resulting catalyst is hereinafter termed catalyst L.

Example 10

The procedure of Example 1 was employed using $MoO_3$ (13.7 g.), $KHCO_3$ (9.6 g.), and $(NH_4)ReO_4$ (7.7 g.) in 7.4 M $NH_4OH$ (170 ml.). The resulting catalyst is hereinafter termed catalyst M.

The compositions of the resulting catalysts are set out in the following Table 1.

TABLE 1

| Catalyst | Support | Component (1) | Component (2) | Component (3) |
|---|---|---|---|---|
| A | 97% $Al_2O_3$ | | | 3.0% Pd |
| B | 97% $Al_2O_3$ | | | 3.0% Cu |
| C | 80% $Al_2O_3$ | 15.4% $MoO_3$ | 4.6% $K_2O$ | |
| D | 80% $Al_2O_3$ | 14.3% $MoO_3$ | 4.7% $K_2O$ | 1.0% Pd |
| E | 80% $Al_2O_3$ | 14.6% $MoO_3$ | 4.8% $K_2O$ | 0.6% Cu |
| F | 80% $Al_2O_3$ | 13.7% $MoO_3$ | 4.5% $K_2O$ | 1.8% Pt |
| G | 80% $Al_2O_3$ | 13.7% $MoO_3$ | 4.5% $K_2O$ | 1.8% Re |
| H | 80% $Al_2O_3$ | 14.6% $MoO_3$ | 4.8% $K_2O$ | 0.6% Co |
| I | 80% $Al_2O_3$ | 14.3% $MoO_3$ | 4.7% $K_2O$ | 1.0% Ag |
| J | 80% $Al_2O_3$ | 14.6% $MoO_3$ | 4.8% $K_2O$ | 0.7% Zn |
| K | 80% $Al_2O_3$ | 14.6% $MoO_3$ | 4.8% $K_2O$ | 0.6% Ni |
| L | 80% $SiO_2$ | 14.6% $MoO_3$ | 4.8% $K_2O$ | 0.6% Co |
| M | 77.3% $Al_2O_3$ | 13.2% $MoO_3$ | 4.4% $K_2O$ | 5.1% Re |

It will be noted that the catalysts A, B and C lack one or more of the essential components of catalysts according to the present invention. They are provided for purposes of comparison only.

Comparison Test 4

Catalysts A, B and C were activated by heating at 500° C. in a stream of hydrogen for 3 hours. They were then used to dehydrogenate isoamylenes in the presence of a hydrogen acceptor under the conditions set out below:

Reaction temperature _____ 400° C.
Reaction pressure _____ Atmospheric.
GHSV _____ 300.
Acceptor/i-$C_5^-$ mole ratio _____ 1/4.

The results obtained are set out in the following Table 2.

TABLE 2

| Catalyst | Activation gas | Acceptor | Conversion, percent wt. | Isoprene yield, percent wt. | Selectivity, percent wt. i-$C_5$ |
|---|---|---|---|---|---|
| A | $H_2$ | $CO_2$ | 9.0 | 0.5 | 5 |
| C | $H_2$ | $CO_2$ | 1.5 | 1.4 | 93 |
| D | $H_2$ | $CO_2$ | 7.2 | 6.8 | 94 |
| B | $H_2$ | $C_3^-$ | 9.4 | 0.1 | 1 |
| C | $H_2$ | $C_3^-$ | 1.3 | 0.6 | 46 |
| E | $H_2$ | $C_3^-$ | 6.0 | 5.6 | 93 |

Example 11

Catalysts D and E were activated in the manner described in Comparison Test 4. They were then used to dehydrogenate isoamylenes in the presence of a hydrogen acceptor under the conditions of Comparison Test 4. The results obtained are set out in Table 2.

Table 2 clearly illustrates the beneficial effect of dehydrogenating isoamylenes over a catalyst containing molybdenum oxide in combination with another metal.

Example 12

Catalyst F was activated by heating at 500° C. in a stream of hydrogen for 3 hours. It was then used to dehydrogenate isoamylenes in the presence of a hydrogen acceptor under the conditions set out below:

Reaction temperature _____ 400° C.
Reaction pressure _____ Atmospheric.
GHSV _____ 300.
Acceptor/i-$C_5^-$ mole ratio _____ 1/4.

The results obtained are set out in the following Table 3.

TABLE 3

| Activation gas | Acceptor | Conversion, percent wt. | Isoprene yield, percent wt. | Selectivity, percent wt. i-$C_5^-$ |
|---|---|---|---|---|
| $H_2$ | None | 5.5 | 5.2 | 95 |
| $H_2$ | $CO_2$ | 9.4 | 8.6 | 92 |
| $H_2$ | $C_5^-$ | 8.4 | 7.9 | 94 |

Table 3 clearly indicates the beneficial effect of dehydrogenating isoamylenes in the presence of a hydrogen acceptor.

Comparison Test 5

Catalyst C was activated by heating at 500° C. in a stream of air or hydrogen for 3 hours. It was then used to dehydrogenate isoamylenes in the presence of a hydrogen acceptor under the conditions set out below:

Reaction temperature _____ 400° C.
Reaction pressure _____ Atmospheric.
GHSV _____ 300.
Acceptor/i-$C_5^-$ mole ratio _____ 1/4.

The results obtained are set out in the following Table 4.

Example 13

Catalyst E was activated in the manner described in Comparison Test 5. It was then used to dehydrogenate isoamylenes in the presence of a hydrogen acceptor under the conditions of Comparison Test 5. The results obtained are set out in the following Table 4.

TABLE 4

| Catalyst | Activation gas | Acceptor | Conversion, percent wt. | Isoprene yield, percent wt. | Selectivity percent wt. i-$C_5^-$ |
|---|---|---|---|---|---|
| C | Air | $CO_2$ | 1.2 | 0.8 | 67 |
| E | Air | $CO_2$ | 6.6 | 6.4 | 97 |
| C | Air | $C_3^-$ | 2.5 | 1.9 | 76 |
| E | Air | $C_3^-$ | 5.6 | 5.3 | 95 |
| C | $H_2$ | $CO_2$ | 1.5 | 1.4 | 93 |
| E | $H_2$ | $CO_2$ | 6.6 | 6.3 | 95 |
| C | $H_2$ | $C_3^-$ | 1.3 | 0.6 | 46 |
| E | $H_2$ | $C_3^-$ | 6.0 | 5.6 | 93 |

Table 4 illustrates the beneficial effect of dehydrogenating isoamylenes over a catalyst containing molybdenum oxide in combination with copper.

Reaction pressure _____ Atmospheric.
GHSV _____ 300.
Acceptor/i-$C_5^-$ mole ratio ____ 1/4.
Reaction temperature _____ As indicated in Table 5.

The results obtained are set out in the following Table 5.

TABLE 5

| Catalyst | Activation gas | Acceptor | Reaction temperature, °C. | Conversion, percent wt. | Isoprene yield, percent wt. | Selectivity, percent wt. i-$C_5^-$ |
|---|---|---|---|---|---|---|
| F | Air | $C_3^-$ | 400 | 8.0 | 7.5 | 94 |
| G | Air | $CO_2$ | 400 | 6.4 | 6.0 | 94 |
| H | $H_2$ | $CO_2$ | 400 | 5.8 | 5.0 | 86 |
| D | Air | $CO_2$ | 400 | 8.9 | 8.7 | 98 |
| D | Air | $CO_2$ | 500 | 13.6 | 12.6 | 93 |
| I | Air | $CO_2$ | 400 | 4.2 | 3.3 | 78 |
| I | $H_2$ | $CO_2$ | 400 | 4.5 | 3.6 | 81 |
| J | Air | $C_3^-$ | 400 | 3.7 | 3.2 | 88 |
| J | $H_2$ | $CO_2$ | 400 | 3.6 | 3.4 | 93 |
| K | $H_2$ | $C_3^-$ | 400 | 4.1 | 3.6 | 88 |
| K | $H_2$ | CO] | 400 | 4.6 | 4.3 | 90 |

Table 5 illustrates the use of alternative catalysts for the dehydrogenation of isoamylenes.

Example 15

Catalyst D was activated by heating at 500° C. in a stream of air for 3 hours. It was then used to dehydrogenate ethylbenzene in the presence of a hydrogen acceptor under the conditions set out below:

Reaction temperature _____ 400° C.
Reaction pressure _____ Atmospheric.
LHSV _____ 0.84.
Acceptor/ethylbenzene mole ratio _____ 4/1.

The results obtained are set out in the following Table 6.

TABLE 6

| Activation gas | Acceptor | Conversion, percent wt. | Styrene yield, percent wt. | Selectivity, percent wt. styrene |
|---|---|---|---|---|
| Air | None (i.e. $N_2$) | 3.3 | 2.9 | 89 |
| Air | $CO_2$ | 3.3 | 3.1 | 95 |

Table 6 clearly indicates the beneficial effect of dehydrogenating ethylbenzene in the presence of a hydrogen acceptor.

Example 16

Catalyst D and L were activated by heating at 500° C. in a stream of air for 3 hours. They were then used to dehydrogenate butenes in the presence of a hydrogen acceptor under the conditions set out below:

Reaction temperature _____ 400° C.
Reaction pressure _____ Atmospheric.
Acceptor/butenes mole ratio _____ 4/1.

The results obtained are set out in the following Table 7.

TABLE 7

| Catalyst | Acceptor | Conversion, percent wt. | Butadiene yield, percent wt. | Selectivity, percent wt. $C_4^-$ |
|---|---|---|---|---|
| D | None (i.e. $N_2$) | 0.9 | 0.8 | 87 |
| D | $CO_2$ | 1.9 | 1.8 | 94 |
| L | None (i.e. $N_2$) | 0.9 | 0.7 | 78 |
| L | $CO_2$ | 1.4 | 1.2 | 86 |

Table 7 clearly indicates the beneficial effect of dehydrogenating butenes in the presence of a hydrogen acceptor.

Example 17

Catalyst M was activated by heating at 550° C. in a stream of air for 3 hours. It was then used to dehydrogenate isoamylenes in the presence of a hydrogen acceptor under the conditions set out below:

Reaction temperature _____ 500–550° C.
Reaction pressure _____ Atmospheric.
GHSV _____ 900.
Acceptor/i-$C_5^-$ mole ratio _____ 4/1.

The result obtained are set out in the following Table 8.

TABLE 8

| Temperature | Acceptor | Conversion, percent wt. | Isoprene yield, percent wt. | Selectivity, percent wt. isoprene |
|---|---|---|---|---|
| 500 | None (i.e. $N_2$) | 4.2 | 3.8 | 90 |
| 525 | do | 5.6 | 4.9 | 88 |
| 550 | do | 7.9 | 6.6 | 83 |
| 500 | $CO_2$ | 5.75 | 5.7 | 99 |
| 525 | $CO_2$ | 6.0 | 5.9 | 98 |
| 550 | $CO_2$ | 7.9 | 7.6 | 96 |

Table 8 clearly indicates the beneficial effect of dehydrogenating isoamylenes in the presence of a hydrogen acceptor with regards to both yield and selectivity to isoprene at each temperature.

We claim:
1. A process for the dehydrogenation of a hydrocarbon which process comprises contacting the hydrocarbon in the presence of carbon dioxide as a hydrogen acceptor, at a temperature in the range 250° C. to 550° C. and a pressure in the range 0.1 millimeter of mercury to 2000 p.s.i.g., with a catalyst prepared by impregnating a sup- port with a solution of (1) a compound of molybdenum, which decomposes of heating to form an oxide, a solution of (2) a basic compound of a metal selected from the group consisting of alkali and alkaline earth metals and a solution of (3) a compound of a metal selected from Groups I–B, II–B, III, IV, V, VII and VIII of the Periodic Table according to Mendeleef, chromium, tungsten and uranium, and drying the impregnated material, and wherein said catalyst contains 0.5 to 40 percent by weight of molybdenum oxide, 0.01 to 15 percent by weight of molybdenum oxide, 0.01 to 15 percent by weight of the base, expressed as percent alkali or alkaline earth metal oxide, and 0.1 to 20 percent of the component (3), expressed as percentage by weight metal.

2. A process according to claim 1 wherein the hydrocarbon is selected from the group consisting of $C_{4-20}$ linear, branched or cyclic alkanes, alkenes and polyenes.

3. A process according to claim 2 wherein the hydrocarbon is selected from an n-butene, isoamylene and ethylbenzene.

4. A process according to claim 1 wherein the molar ratio of the hydrogen acceptor to the hydrocarbon is in the range 0.1:1 to 9:1.

5. A process according to claim 1 wherein the Gas Hourly Space Velocity is in the range 10 to 30,000.

6. A process according to claim 1 wherein the Liquid Hourly Space Velocity is in the range 0.1 to 10.

References Cited
UNITED STATES PATENTS

| | | | |
|---|---|---|---|
| 3,321,545 | 5/1967 | Rigney et al. | 260—683.3 |
| 3,345,427 | 10/1967 | Michaels et al. | 260—680 R |
| 3,267,170 | 8/1966 | Aldridge et al. | 260—683.3 |
| 3,278,619 | 10/1966 | Bloch | 260—683.3 |
| 3,406,219 | 10/1968 | Olson | 260—669 R |

CURTIS R. DAVIS, Primary Examiner

U.S. Cl. X.R.

260—680 R, 683.3

PO-1050
(5/69)

UNITED STATES PATENT OFFICE
CERTIFICATE OF CORRECTION

Patent No. 3,763,257  Dated October 2, 1973

Inventor(s) Bradshaw et al

It is certified that error appears in the above-identified patent and that said Letters Patent are hereby corrected as shown below:

Column 1, line 20 "consisting of alkali alkaline" should be -- consisting of alkali and alkaline --; line 40 "oher" should be -- other --. Column 2, line 11 "greater" should be -- great --; line 50 "stream" should be -- steam --. Column 3, line 9 "Solution" should be -- Solutions --. Column 4, Table 1, right hand column designated "(3)", third line from bottom "Ni9" should be -- Ni --. Column 5 between lines 32 and 33 insert the following --

Example 14

Catalysts D, F, G, H, I, J and K were activated by heating at 500°C in a stream of air or hydrogen for 3 hours. They were then used to dehydrogenate isoamylenes in the presence of a hydrogen acceptor under the conditions set out below: --;

Table 5, in column designated "Acceptor" bottom line "CO]" should be -- $CO_2$ --. Column 6, line 54 "result" should be -- results --; line 74 "millimeter" should be -- millimetres --. Column 7, line 2 after "decomposes", change "of" to -- on --; lines 10 and 11 delete "0.01 to 15 percent by weight of molybdenum oxide,".

Signed and sealed this 5th day of February 1974.

(SEAL)
Attest:

EDWARD M. FLETCHER, JR.
Attesting Officer

RENE D. TEGTMEYER
Acting Commissioner of Patents